United States Patent [19]

Goddijn

[11] 4,206,374

[45] Jun. 3, 1980

[54] SYNCHRONOUS MOTOR

[75] Inventor: Bernardus H. A. Goddijn, Eindhoven, Netherlands

[73] Assignee: U.S. Philips Corporation, New York, N.Y.

[21] Appl. No.: 808,784

[22] Filed: Jun. 22, 1977

[30] Foreign Application Priority Data

Jul. 5, 1976 [NL] Netherlands ........................ 7607381
Feb. 14, 1977 [NL] Netherlands ........................ 7701510

[51] Int. Cl.² .......................................... H02K 37/17
[52] U.S. Cl. ................................. 310/49 R; 310/112; 310/114; 310/162
[58] Field of Search .......................... 310/49, 162–165, 310/112, 114, 126, 156

[56] References Cited

U.S. PATENT DOCUMENTS

| | | | |
|---|---|---|---|
| 2,796,571 | 6/1957 | Dunn | 310/164 X |
| 3,343,014 | 9/1967 | Giles | 310/49 |
| 3,401,322 | 9/1968 | O'Regan | 310/49 |
| 3,878,414 | 4/1975 | Harakawa | 310/156 |
| 3,950,663 | 4/1976 | Mead | 310/112 X |

Primary Examiner—Donovan F. Duggan
Attorney, Agent, or Firm—Robert S. Smith

[57] ABSTRACT

A synchronous motor, in particular a stepping motor, with two coaxial stator sections which are each provided with a ring coil and with two circular systems of teeth, which are shifted by half a tooth pitch relative to each other. The two stator sections are shifted by a quarter tooth pitch relative to each other. In addition, the motor comprises an axially magnetized permanent-magnetic ring which is disposed between the two stator systems, for magnetizing the two systems of teeth of the stator sections with mutually the same polarity. The two systems of teeth of each stator section are constituted by annular parts which are provided with teeth at the inner circumference. The annular parts form part of the magnetic circuit which surrounds the annular coil and are disposed concentrically in such a way that the axial distance between the teeth of both systems is at least a few times greater than the air gap between stator and rotor.

10 Claims, 13 Drawing Figures

SYNCHRONOUS MOTOR

The invention relates to a synchronous motor comprising at least two coaxial stator sections which are each provided with at least one annular coil, which annular coil is surrounded by a magnetic circuit of a soft ferromagnetic material, which circuit is constituted by a rotor section with teeth and by the stator section which surrounds the relevant annular coil, which stator section terminates in two systems of stator teeth which are arranged in a circle, and which co-operate with the rotor teeth across air gaps in such a manner that at any time the position of one of both systems of stator teeth of each stator section relative to the co-operating rotor teeth differs half a tooth pitch from the position of the other system of stator teeth of that stator section relative to the co-operating rotor teeth, means being provided for each stator teeth with mutually the same polarity.

Figure 3:
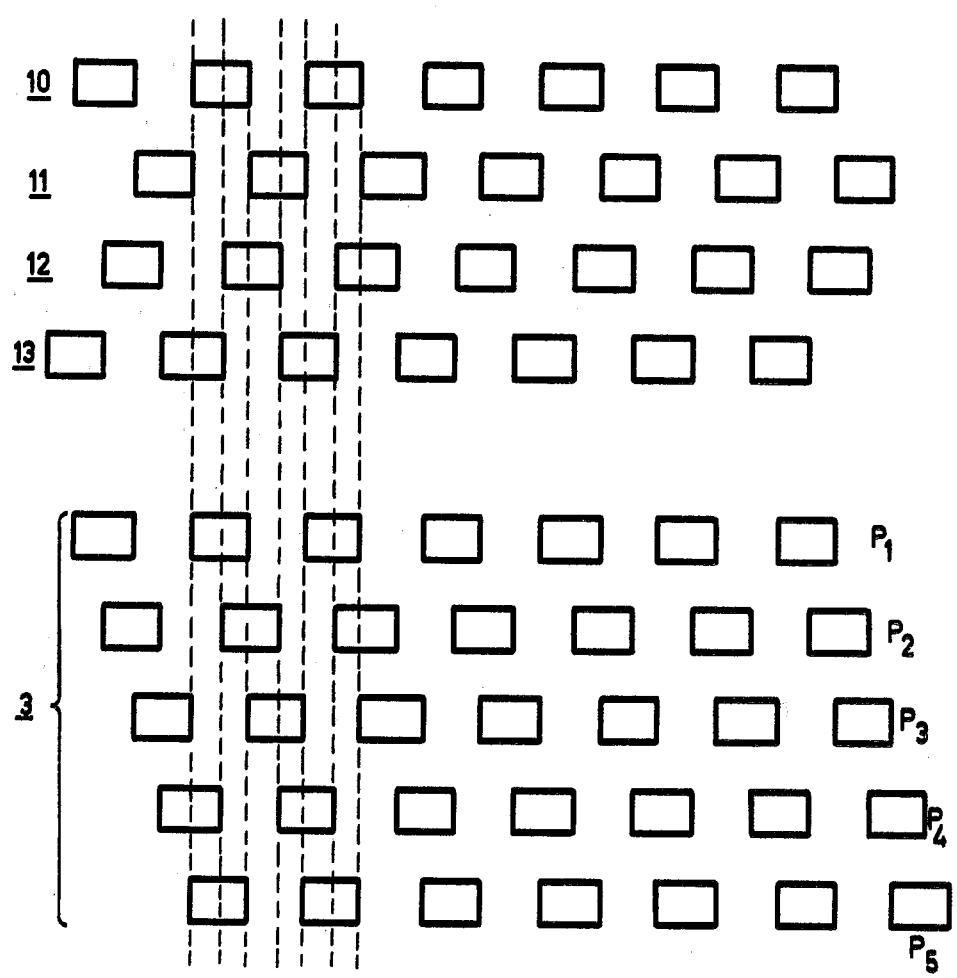

Such a motor is particularly suitable as stepping motor and is known from German Patent Application No. 25 14 503, FIG. 3, which has been laid open for public inspection. In this motor the said means are constituted by an axially magnetized annular permanent magnet which is coaxial with two stator sections and is disposed between these two stator sections. This permanent magnet magnetizes the two systems of teeth of each stator section with the same polarity, while the annular coil associated with said stator section magnetizes the two systems of teeth with opposite polarity. As a result of this the rotor exhibits a preferred position relative to the teeth of one of the two systems of teeth depending on the sense of energization of said annular coil. These two positions are offset by half a tooth pitch relative to each other. The other stator section is shifted by a quarter tooth pitch relative to the one stator section, so that there are preferred positions. If the two stator coils are energized in the correct sequence, the rotor performs a rotary movement in a synchronous or stepwise fashion, depending on the nature of the energization.

In this known motor both systems of stator teeth of each stator section are constituted by axially extending teeth, the teeth of both systems interdigitate, i.e. at any time one tooth of the one system being disposed between two teeth of the other system. It is found that the electromagnetic properties of this motor deteriorate substantially when the stepping angle, which is related to the number of poles per circumference, is reduced, for example to 1.8° which corresponds to 50 teeth per system.

It is an object of the invention to provide a motor of the type mentioned in the preamble which is extremely suitable to be equipped with a large number of stator teeth per system of stator teeth.

For this purpose the invention is characterized in that the two systems of teeth of each stator section are constituted by annular parts which are provided with teeth at the inner circumference, which annular parts both form part of the magnetic circuit which surrounds the annular coil and which annular parts are disposed concentrically in such a way that the axial distance between the teeth of the two systems is at least a few times greater than the air gap between the systems of stator teeth and the rotor.

The step in accordance with the invention readily enables a construction to be realized with a large number of teeth per system of stator teeth, without giving rise to impermissible stray fields in the air gap.

It is found that the torque produced by this motor as a function of the rotor position is non-symmetrical, i.e. it is not the same for both current directions which are possible in the stator coils. This asymmetry also results from the fact that the magnetic resistance constituted by the air gap formed by the permanent magnetic ring is not infinite, so that via the permanent magnetic ring magnetic circuits are formed for the fields produced by the stator coils. As the directions of these fields depend on the direction of the energizing current through these coils, the working point of said permanent magnetic ring depends on this direction of energization, which also causes said asymmetric torque.

Said asymmetry may also result from the fact that the magnetic resistances from said means for magnetizing the systems of stator teeth to each of the two systems of teeth are unequal for each stator section. Other types of asymmetry also lead to asymmetric torques, depending on the design of the motor in accordance with the invention.

These asymmetries can be compensated for in that the stator sections are divided into an even number of segments along axial surfaces, the stator teeth for each stator section being mutually shifted by half a tooth pitch relative to the rotor teeth of each time two adjacent segments and said means for each stator section magnetizing the two systems of each time two adjacent segments with opposite polarities.

Asowing to said means the magnetization of two adjacent segments is oppositely directed and the teeth are shifted by half a tooth pitch relative to each other, the asymmetries in the torque owing to each of these segments are in phase opposition and do not appear in the total torque produced by the rotor.

The asymmetries in the torque of a motor in accordance with the invention may also be compensated for by a step which is characterized in that the motor comprises at least one compensation coil whose magnetic circuit is in parallel with the magnetic circuit of said means.

This compensation coil may increase or reduce the influence of said means. By energizing this compensation coil depending on the energization of the stator coils a symmetrical torque can be obtained. The correct method of energizing the compensation coil can readily be determined empirically.

If said means are constituted by an axially magnetized ring which is coaxially disposed between two stator sections, it is advantageous that said compensation coil is annular and is disposed between the two stator sections coaxially with the permanent-magnetic ring.

For said steps in accordance with the invention it is advantageous to avoid air gaps in the magnetic stator circuits which surround the annular coils. This is suitably achieved in that the magnetic stator circuits surrounding the ring coils comprise integrally manufactured laminations which are substantially disposed in axial planes.

These laminations can be arranged correctly in a simple manner when the ring coils are surrounded by a coil former provided with positioning means for the alignment of the laminations.

For forming the stator teeth in the case that the laminations are used, it is of advantage that said laminations are U-shaped, the limbs of the laminations extending within the airgap between stator and rotor for the formation of the systems of stator teeth, while said positioning means are such that in the air gap, the end of the one limb of each U-shaped lamination is shifted by half a tooth pitch relative to the end of the other limb.

In this motor, which employs an axially magnetized permanent-magnetic ring, it is of advantage for a minimal dispersion of the flux of this permanent magnet that the laminations at the side facing the permanent-magnetic ring are provided with a folded portion which is disposed in a plane which is substantially perpendicular to the axis for the conduction of the flux of the permanent magnet.

With a synchronous motor in accordance with the invention in which the permanent magnetic ring is situated between the two stator sections as asymmetry may occur in that the magnetic resistances of the permanent magnetic rings to each of the two systems of teeth are unequal per stator region. An advantageous construction which eliminates this, is characterized in that the two magnetic stator circuits of the two stator sections, which circuits surround the ring coils, each time consist of two parallel annular plates which are disposed in planes substantially perpendicular to the rotor axis, at whose inner circumference said systems of teeth are formed and whose outer circumference each time adjoins the inner surface of a cylindrical ring belonging to said stator section, between which plates and the cylindrical ring the ring coil is interposed, the two cylindrical rings extending as far as the permanent magnetic ring and being provided with means for catching the flux of the permanent magnetic ring, so that between the two annular plates facing the permanent magnetic ring and the permanent magnetic ring spaces are obtained with a magnetic resistance which is comparatively high relative to the magnetic resistance between the permanent magnetic ring and the cylindrical rings.

In this construction the flux of the permanent magnet passes via said catching means to the cylindrical ring and hence, via a transition, to the two annular plates, so that the paths to the two systems of teeth are identical.

The last-mentioned construction necessarily results in spaces between stator sections and permanent magnet. These spaces are utilized effectively if in said spaces annular coaxially disposed compensation coils are accommodated. These coils then have a similar function as the previously mentioned compensation coil.

Figure 1:
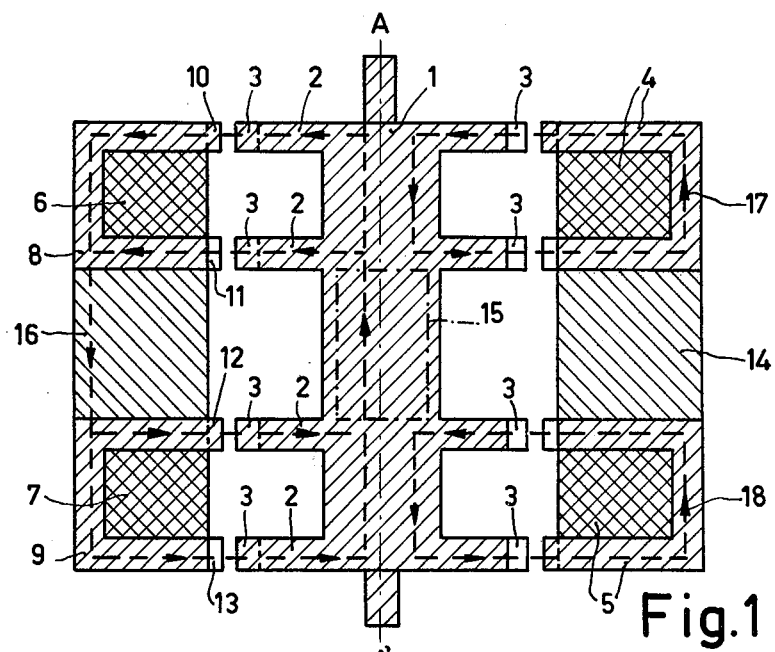
Figure 4:
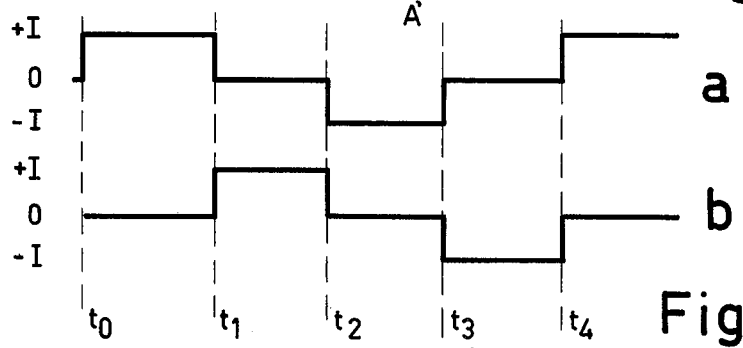
Figure 5:
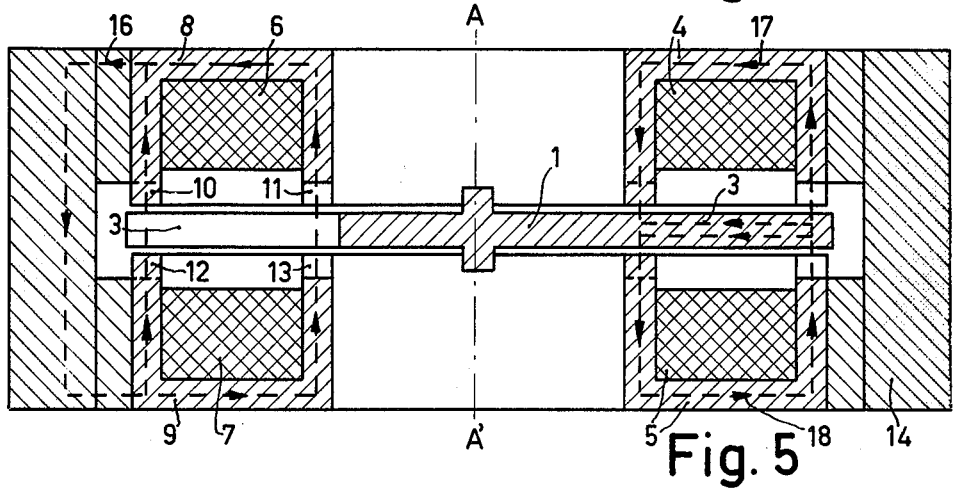
Figure 2:
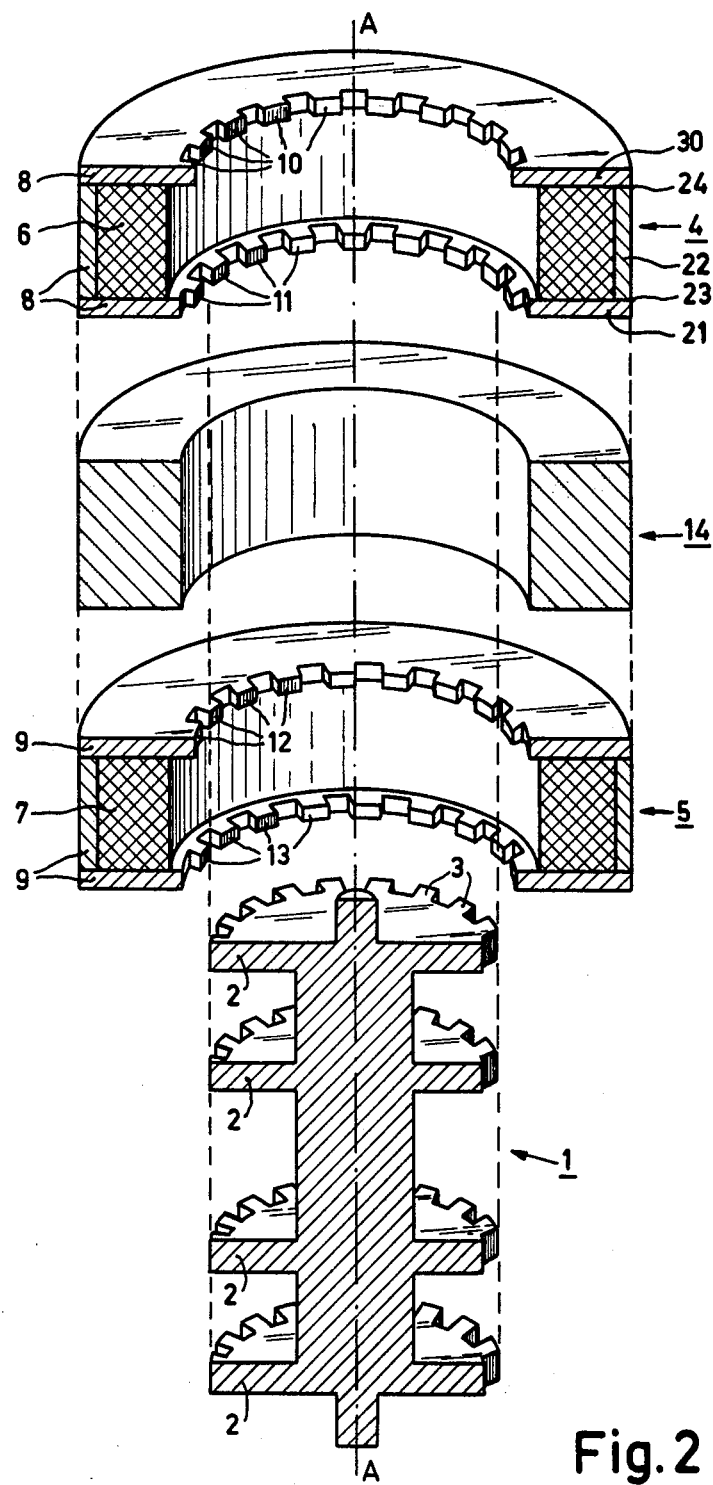
Figure 6:
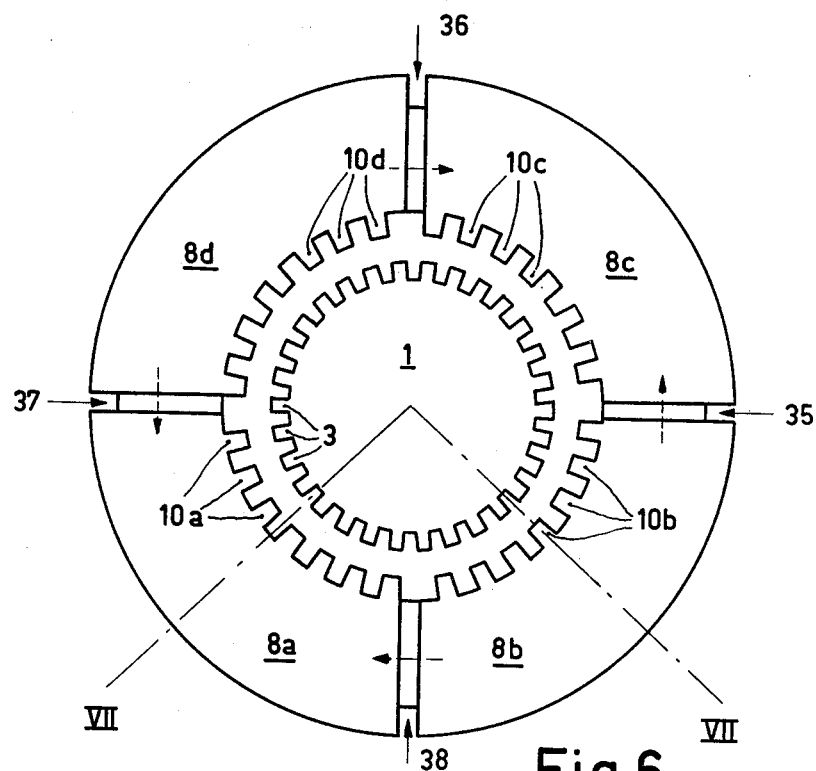
Figure 7:
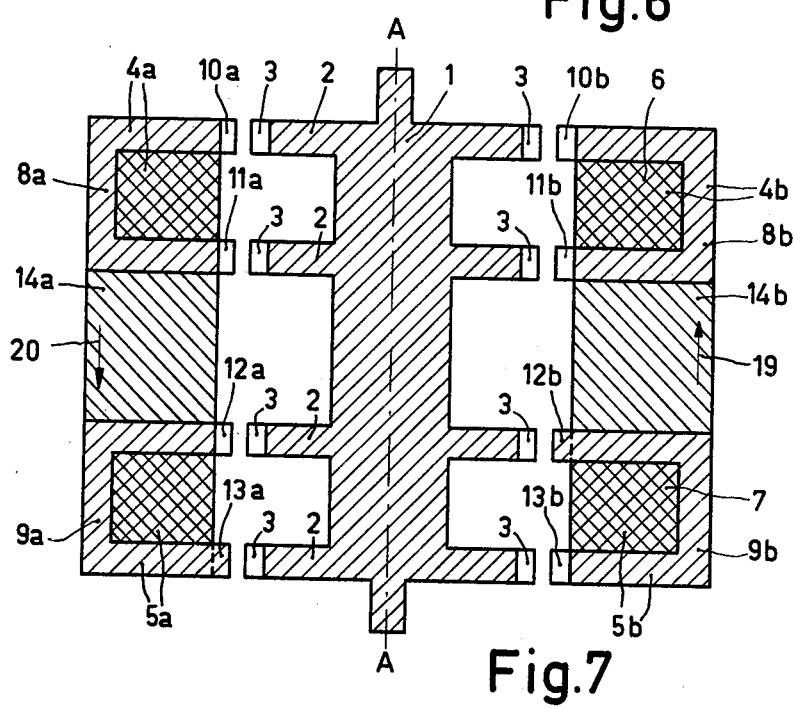
Figure 8:
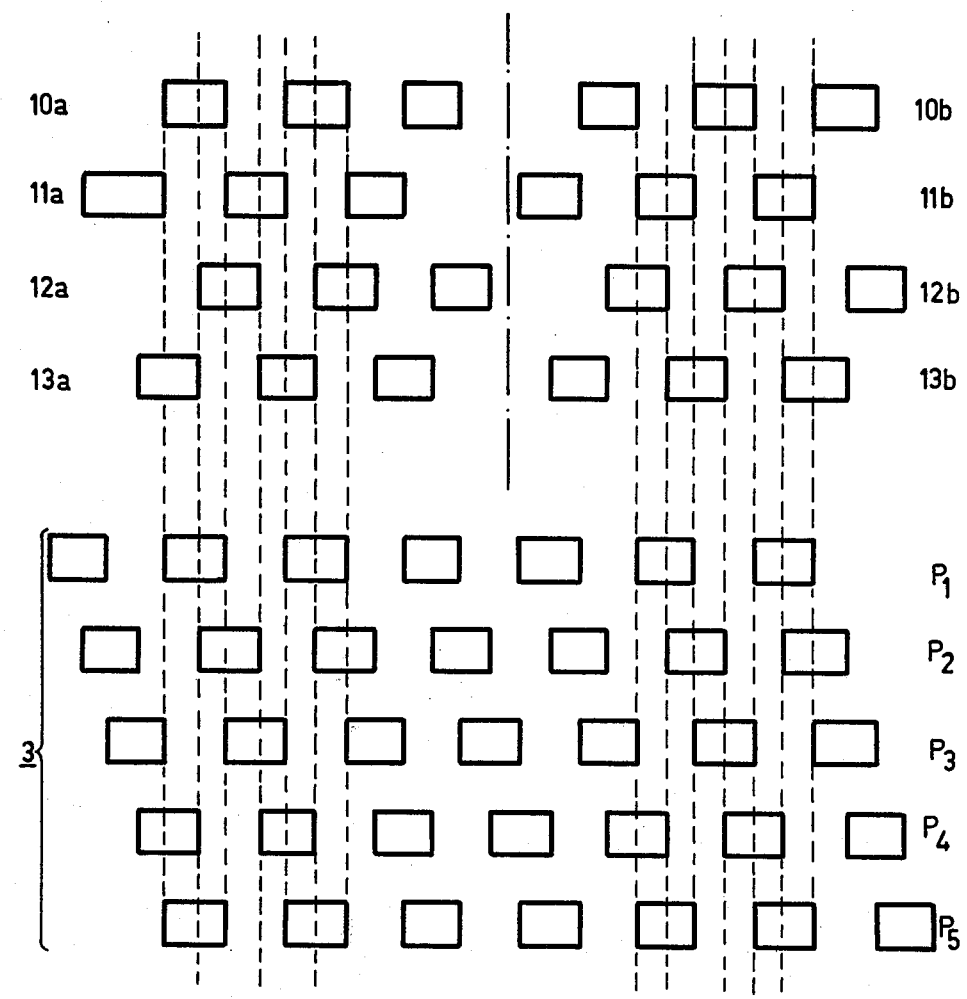
Figure 9:
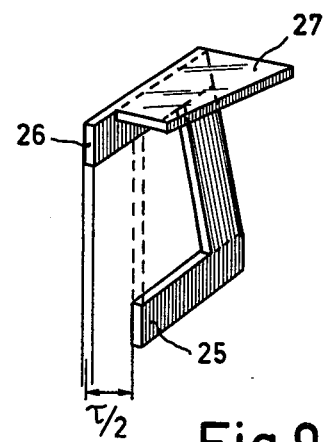
Figure 10:
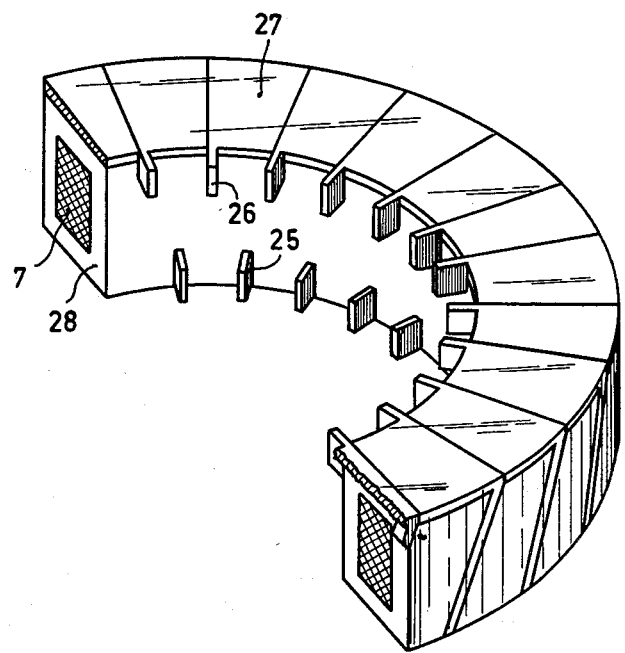

The invention will now be described in more detail with reference to the drawings, in which:

FIG. 1 shows an axial cross-section of a motor in accordance with the invention, FIG. 2 is an exploded view corresponding to said axial cross-section, FIG. 3 schematically shows the positions of the stator and rotor teeth relative to each other, FIG. 4 is an energizing diagram for the motor in accordance with FIGS. 1, 2, 5, 6 and 7, FIG. 5 shows an alternative version of the motor of FIG. 1 in axial cross-section, FIG. 6 is a plan view of an embodiment of a motor in accordance with the invention with segmented stator, FIG. 7 shows an axial cross-section of the motor in accordance with FIG. 6 taken on the line VII—VII, FIG. 8 schematically shows the positions of the stator and rotor teeth of the motor in accordance with FIGS. 6 and 7 relative to each other, FIG. 9 is a perspective view of a lamination in accordance with a further characteristic feature of the invention, FIG. 10 shows the construction of a stator section with laminations in accordance with FIG. 9.

Figure 11:
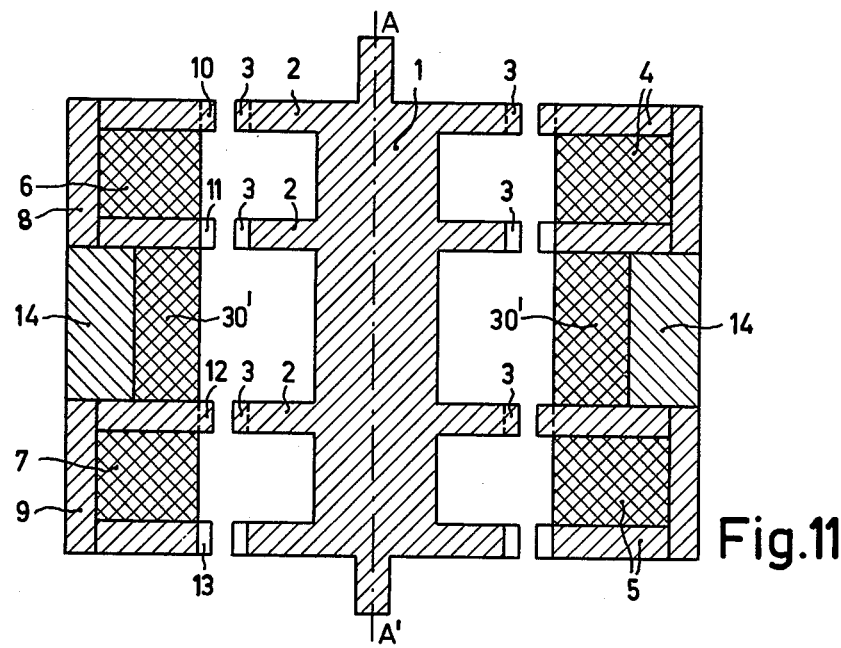
Figure 12:
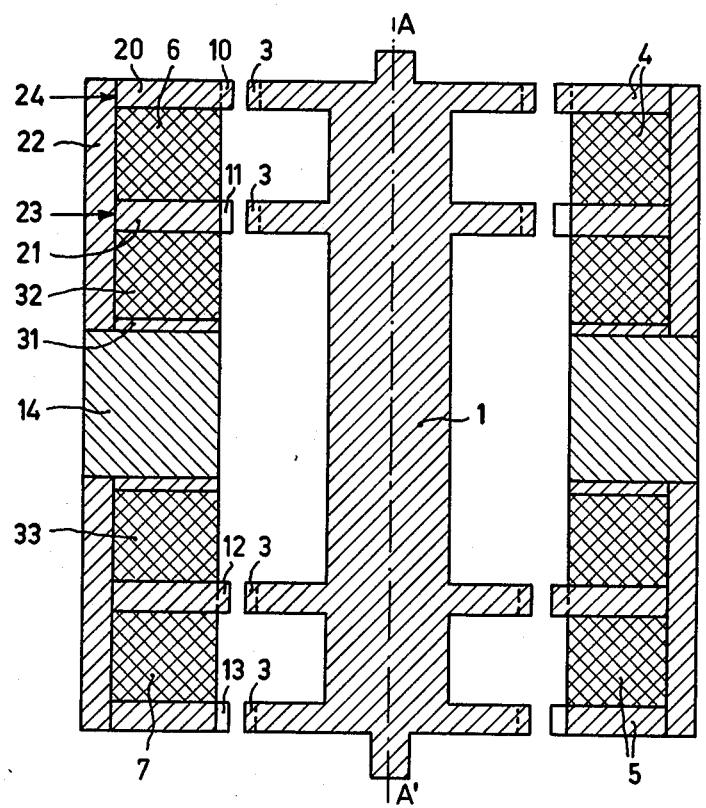
Figure 13:
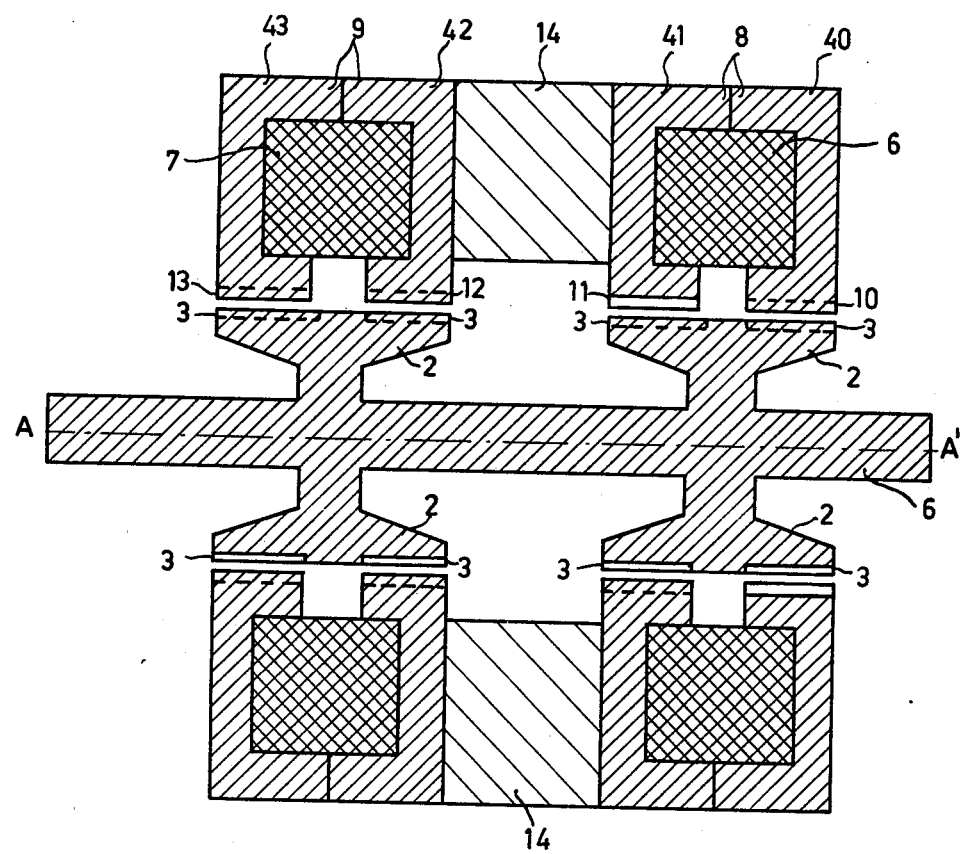

FIG. 11 shows a motor in accordance with FIG. 1 provided with a compensation coil, FIG. 12 shows a suitable variant of the motor in accordance with FIG. 11, and FIG. 13 shows a suitable variant of the motor in accordance with FIG. 1.

FIG. 1 is an axial cross-section of a motor to which the steps in accordance with the invention may be applied, FIG. 2 being an axial cross-section of the motor in perspective. The motor is rotation-symmetrical about the axis A-A'. It comprises a rotor 1, which consists of a cylindrical body with four circular discs 2 which are disposed in a plane perpendicular to the axis A-A', which discs are provided with a regular pattern of rotor teeth 3 along the circumference. The rotor is made of a soft ferro-magnetic material.

The stator comprises two sections 4 and 5 which each consists of an annular coil 6 and 7 respectively, which are surrounded by a yoke 8 and 9 respectively, of a soft ferromagnetic material, which yokes terminate in annular systems of teeth 10, 11 and 12, 13 respectively. These toothings are disposed in the same plane as the rotor disc 2 and all comprise an equal number of teeth. A stepping motor with a stepping angle of 1.8° requires 50 teeth per circumference. In each stator segment the teeth in the two systems are shifted by half a tooth pitch relative to each other, while the two sections are shifted by a quarter tooth pitch relative to each other.

The two stator sections are axially separated by a ring 14 of a permanent magnetic material, which ring is axially magnetized.

The permanent magnet 14 gives rise to a magnetic field, which is represented in the left half of FIG. 1 by a dashed line 16 with arrows. For this field the two stator sections 4 and 5 and the rotor 1 are in series, whilst per stator section the two air gaps near the teeth 10, 11 and 12, 13 respectively are in parallel. As a result of this the magnetic potential difference across every pair of air gaps is substantially equal and equally directed owing to the permanent magnet.

For a certain energization the ring coils 6 and 7 produce a field as represented in the right half of FIG. 1 by dashed lines 17 and 18 provided with arrows. The magnetic circuit for this field per stator section comprises the yokes 8 and 9 respectively, the two systems of teeth 10, 11 and 12, 13 respectively and the rotor. Owing to this the magnetic potential difference across the air gaps near the systems of teeth 10, 11 and 12, 13 respectively is alternately of different polarity, so that per stator section when the coils are energized the magnetic potential difference across one of the air gaps is reduced and the magnetic potential difference across the other air gap is increased so that one of the two systems of teeth of a stator section is activated as if it were dependent on the sense of energization of the coils. If a certain coil is not energized, the two systems of teeth of said stator section are equally active and because the two systems are shifted by half a tooth pitch relative to each other, no force is exerted on the rotor.

In order to explain the operation of the motor in accordance with FIG. 1 and 2, FIG. 3 schematically shows the mutual position of the systems of stator teeth 10, 11, 12 and 13 and the rotor teeth 3 for five different positions $P_1$ through $P_5$ relative to the stator teeth and FIG. 4 shows an energizing diagram for the coils 6 (FIG. 4a) and 7 (FIG. 4b).

The polarity of the energizing currents in FIG. 4 is defined so that for a positive current (+I) the magnetic potential difference across the air gaps near the stator toothings 10 and 12 is greater than the magnetic potential difference across the air gaps near the stator teeth 11 and 13 respectively.

If it is assumed that at the instant $t_0$ the rotor teeth 3 are disposed slightly before the stator teeth 10, the rotor will move, upon energization of ring coil 6 while ring coil 7 is unenergized, until the rotor teeth 3 are disposed exactly opposite the stator teeth 10. This is the position with the smallest magnetic resistance for that air gap with the greatest magnetic potential difference. This position is denoted $P_1$ in FIG. 3. If at the instant $t_1$ the coil 7 is now energized with a positive current +I and coil 6 is de-energized, the magnetic potential difference across the air gap near the stator teeth 12 will be greatest, while the rotor teeth 3 will be disposed a quarter tooth pitch before the stator teeth 12. The rotor is then attracted until the rotor teeth 10 are opposite the stator teeth 12, this is position $P_2$. Similarly, after the instant $t_2$, after which coil 6 is energized with a negative current and coil 7 is de-energized, the rotor will move to position $P_3$, this is with its teeth 3 opposite the stator teeth 11, and after the instant $t_3$, after which coil 7 is energized with a negative current and coil 6 is de-energized, to position $P_4$, this opposite the stator toothing 13. The rotor now assumes a similar position relative to the stator toothing as just before the instant $t_0$ and a full stepping cycle is completed. A displacement by one tooth pitch is consequently performed in four steps. If the total number of teeth equals 50 the stepping angle will be 1.8°.

FIGS. 1 2 and 3 show that the two systems of teeth in each stator section are shifted angularly by half a tooth pitch relative to each other and that the two stator sections are shifted angularly by a quarter tooth pitch relative to each other. The angular relationship of the systems of stator teeth may also be stated relative to the upper (as viewed in FIG. 3) system of stator teeth 10. From FIG. 3 it will be apparent that axially successive systems of rotor teeth are shifted by 0, ½, ¼ and ¾ tooth pitch relative to system of stator teeth 10. For a correct operation of the motor the position of the one system of stator teeth relative to the corresponding system of rotor teeth per stator section should be shifted by half a tooth pitch relative to the position of the other system of stator teeth relative to the corresponding system of rotor teeth.

The motor may consist of more than two stator sections. These sections are then always separated by a ring magnet which is axially magnetized in the appropriate direction.

It is possible to replace the ring magnet 14 by a ring coil.

It is also possible to include the permanent msgnet in the rotor in such a way that the field line pattern is maintained, for example an axially magnetized magnet, or a ring coil, at the location indicated by the dash-dot line 15 in FIG. 1. When the permanent magnet is disposed in this manner a good magnetic conductor must be provided instead of annular magnet 14.

For the purpose of illustration FIG. 5 shows a longitudinal section of a motor whose operation is the same as that of the motor of FIG. 1. The various parts are numbered in accordance with FIG. 1 and the description applies to it. The motor in accordance with FIG. 5 has been obtained by axially compressing the rotor of the motor in accordance with FIG. 1 to one disc and by increasing the tooth depth. The two stator sections are now disposed above and underneath the disc and cooperate with one and the same system 3 of rotor teeth. The various magnetic circuits are represented by dashed arrows in the same way as in FIG. 1.

In practice the motor of FIG. 1 is found to produce asymmetrical torques for various reasons, inter alia owing to the difference in magnetic resistance from the permanent magnet 14 to, for example, the system of teeth 10 and the system of teeth 11 and the difference in magnetic-resistance of the air gaps belonging to these systems of teeth viewed through the field of the coil 6, owing to the difference in the directions of the fields in these air gaps. A solution to this problem is the axial division of the stator section into an even number segment whose teeth are shifted relative to each other by half a tooth pitch, the polarity of the corresponding segment of the magnetic ring 14 being also reversed.

FIG. 6 is a plain view of the motor in accordance with FIG. 1 to which this step is applied (which may for example also be used in the motor of FIG. 5). The Figure shows the top surface of the yoke 8 of stator section 4 with stator teeth 10 and the rotor 1 with rotor teeth 3. The stator is divided into four segments, designated a, b, c, d. The segments b and d as well as the segments a and c are identical, while the teeth 10a and 10c are shifted by half a tooth pitch relative to the teeth 10b and 10d. As a result of this the 10b and 10d are shifted by half a tooth pitch relative to the rotor teeth 3 when the teeth of the toothings 10a and 10c are exactly opposite the rotor teeth. The teeth 11, not shown, are again shifted by half a tooth pitch per segment relative to the teeth 10, while the other stator section 5 is shifted by a quarter tooth pitch relative to the stator section 4. The four segments are separated from each other by means of air gaps in order not to short-circuit the field of the permanent magnet.

FIG. 7 is a cross-section of the motor in accordance with FIG. 6 taken on the line VII—VII and is numbered in a similar way as the motor of FIG. 1 with the addition of the suffixes a and b. The magnetic ring 14 at the location of segment a is magnetized oppositely to the magnetization and the location of segment b, which is indicated by the arrows 19 and 20.

If for a certain energizing current +I through coil 6 the magnetic potential difference across the air gap near system of teeth 10a and 10c is large relative to the magnetic potantial difference across the air gaps near the systems of teeth 11a and 11c, the same applies with respect to the systems of teeth 11b and 11d relative to the systems of teeth 10b and 10d. The same applies to the systems of teeth 12 and 13 in a corresponding manner.

FIG. 8 schematically shows the position of the systems of stator teeth 10, 11, 12 and 13, of which only the segments a and b are shown. The segments c and d occupy the same positions relative to the rotor teeth 3 as the segments a and b respectively. The rotor teeth 3 are shown in five positions $P_1$ through $P_5$, which positions are always shifted by a quarter tooth pitch relative to each other.

The coils are energized in accordance with the energizing diagram of FIG. 4, the polarities of the currents being defined relative to the stator segment a in the same manner as for the motor in accordance with FIG. 1.

It is assumed that at the instant $t_0$ the rotor teeth 3 are disposed slightly before the stator teeth 10a and 10c, and thus slightly before the stator teeth 11b and 11d, the rotor will move until the rotor teeth 3 are exactly opposite said stator teeth upon energization of the ring coil 6 whilst ring coil 7 is unenergized. This is the position $P_1$ in FIG. 8. If at the instant $t_1$ coil 7 is energized with a positive current $+I$ and coil 6 is de-energized, the magnetic potential difference across the air gap near the stator teeth 12a, 12c, 13b and 13d will be greatest, while the rotor teeth 3 is disposed a quarter tooth pitch before said stator toothings. The rotor will then be attracted until the rotor teeth are opposite the last-mentioned stator teeth, this is position $B_2$. Similarly, after the instant $t_2$, after which coil 6 is energized with a negative current and coil 7 is de-energized, the rotor will move to position $P_3$, i.e. with its teeth 3 opposite the stator teeth 11a, 11c, 10b and 10d, and after instant $t_3$, after which coil 7 is energized with a negative current and coil 7 is de-energized, to position $P_4$, this is opposite the rotor teeth 13a, 13c, 12b and 12d. The rotor now has again assumed the same position relative to the stator teeth as just before the instant $t_0$ and a full cycle has been completed.

Although FIGS. 6 and 7 show a division into four axial segments, any axial division into an even number of segments is possible, though a division into two segments is unfavourable because in that case unbalanced radial forces will be exerted on the rotor. In a similar way as with the motor in accordance with FIG. 1 it is possible to arrange the teeth 10, 11, 12 and 13 in the same position and to arrange the various rotor teeth at 0, $\frac{1}{2}$, $\frac{1}{4}$, $\frac{3}{4}$ tooth pitch from each other.

It is also possible to use a plurality of stator sections.

In the segmented motor of FIGS. 6 and 7 the permanent magnetic ring 14 may be replaced by permanent magnets which are disposed in the two stator sections between the segments at the locations 35, 36, 37 and 38 indicated in FIG. 6. These magnets should then be magnetized tangentially relative to the rotor, the direction of magnetization of the magnets at the locations 35 and 37 being opposite to the direction of magnetization of the magnets at the locations 36 and 38, as is indicated by the dashed arrows in FIG. 6.

The stator section for a motor in accordance with the invention can be manufactured simply by enclosing the ring coil 6, 7 between two parallel annular plates 30 and 21 (FIG. 2), and a cylindrical ring 22. This results in two transitions 23 and 24 in the yoke 8. However, it is found that in the case of motors with a small air gap between stator and rotor this gives rise to an asymmetrical torque, because the magnetic resistance in the circuit via plate 21 to the rotor viewed from the permanent magnetic ring 14, is then too small relative to the magnetic resistance in the circuit via plates 22 and 30.

A solution to this problem is to construct the yoke 8 (and 9) from U-shaped laminations which are placed over the ring coil in substantially axial planes. FIG. 9 shows an example of such a U-shaped lamination and FIG. 10 shows the construction of a stator section with such laminations.

The laminations can be made of a flat sheet material and bent in such a way that one of the limbs 25 is shifted by half a tooth pitch $\tau/2$ relative to the other limb 26. Similarly a portion 27 can be bent at right angles. This portion 27 may adjoin the adjacent lamination and also serves as a contact face with the permanent-magnetic ring 14.

FIG. 10 shows the stator section 5. It comprises the ring coil 7 in a former or carrier 28 of for example a plastic. During manufacture suitable slots may be formed in this former into which slots the laminations can be slid. By bending the laminations the one system of teeth is always shifted by half a tooth pitch relative to the other system of teeth.

It is alternatively possible to use non-bent or planar laminations and to slide these onto the coil former in an oblique position relative to the axial planes, or to slip them onto the coil former in axial plane and shift corresponding systems of rotor teeth by half a tooth pitch. Furthermore, the bent portion 27 may be dispensed with when between the magnetic ring 14 and the stator section 5 and 4 respectively a disc of a soft-magnetic material is included. Instead of slots in the coil former it is alternatively possible to use projections and the like for positioning.

It is very advantageous to construct the stator sections in accordance with FIG. 10 for a motor in accordance with FIG. 6, because the shift of the teeth of the segments b and d relative to the segments a and c by half a tooth pitch can simply be obtained by suitably arranging the slots or projections of the coil former 28. The same laminations may then be used for all segments.

For the motor of FIG. 1 it is found that the torque as a function of the rotor position is not symmetrical, i.e. not the same for both possible directions of the current in the coil 6 and 7 respectively. This asymmetry is produced as a result of the magnetic resistance constituted by the air gap formed by the permanent magnet 14 not being infinite so that for the fields produced by the coils 6 and 7 respectively magnetic circuits are formed via the permanent magnet 14. As the direction of these fields depends on the direction of the energizing current through the coils 6 and 7 respectively, the working point of the permanent magnet 14 depends on this direction, which causes the said asymmetrical torque.

FIG. 11 is an axial cross-section of a motor in accordance with FIG. 1 in which steps have been taken to mitigate the said asymmetry. These steps include the incorporation of a coaxial ring coil 30' between the two stator sections 4 and 5. By energizing this ring coil 30' in such a way that the field of this ring coil in the permanent magnet 14 is directed oppositely to the field of the ring coils 6 and 7, the working point of the permanent magnet 14 can be maintained substantially constant.

In the ease that each time one phase is energized the number of ampère-turns (this is the product of the current through the coil and the number of turns of said coil) of coil 30' should be approximately half the number of ampère-turns of the energized coil 6 or 7.

As has already been remarked with respect to the motor in accordance with FIG. 2, the stator sections 4 and 5 for a motor in accordance with the invention can be manufactured in a simple manner by enclosing the ring coils 6 and 7 respectively between two parallel annular toothed plates 20 and 21 (FIG. 2, FIG. 12) and a cylindrical ring 22 which may surround the plates 20 and 21 (FIG. 12). In that case and also with other methods of manufacture, transitions 23 and 24 are formed in the yoke 20, 21, 22. As previously stated, this also leads to an asymmetric torque.

FIG. 12 shows an axial cross-section of a motor in accordance with FIG. 2, for which the last mentioned-problem has been solved. Between the stator systems 4 and 5 and the permanent magnet 14 comparatively large air gaps are formed (in FIG. 12 filled by the coils 32 and 33 respectively). Said cylindrical ring 22 then extends as far as the permanent magnet 14, the flux of said permanent magnet 14 being caught by an annular disc 31 which is surrounded by the cylinder 22. Thus the magnetic path from the permanent magnet 14 to the system of teeth 10 has the same magnetic resistance as the path to the system of teeth 11. The same applies to the stator section 5.

The space which has become available owing to the use of additional airgaps may be used effectively by choosing two ring coils 32 and 33 instead of the compensation coil 30 in the motor of FIG. 11 and to place these ring coils in these two spaces. The ring coils 32 and 33 may then be energized simultaneously (or alternately).

The compensation coils in the motors in accordance with FIGS. 11 and 12, in respect of the energization of one or both stator coils 6 and 7, should be energized so that the magnetic potential difference across the permanent magnet is independent of the energizing condition of the coils 6 and 7.

FIG. 13 is an axial cross-section of a variant of the motor of FIG. 1. Corresponding parts bear the same reference numerals. The parts on which the stator teeth 10, 11, 12, 13 are provided in the motor of FIG. 13 are widened in comparison with the motor of FIG. 1. The two stator sections 8 and 9 consist of two annular parts 40, 41 and 42, 43 respectively, between which the annular coil 6 or 7 is disposed. These parts can be manufactured simply, for example from sintered iron, and provided with teeth, for example by milling the inner circumference, and subsequently assembled with the permanent-magnetic ring 14 shifted through angles of 0°, 180°, 90° and 270° relative to each other.

The rotor 1 comprises a shaft on which two annular parts 2 are mounted, each with an axial length in accordance with that of the stator sections 8 and 9 and constricted near the shaft so as to reduce the mass moment of inertia. These rings 2 are provided with teeth 3 at least opposite the stator teeth 10, 11, 12 and 13, which may for example be formed by milling the outer circumference of the parts 2. The operation of the motor further corresponds to that of the motor of FIG. 1.

The invention is not limited to the embodiment shown. A multiplicity of variants to be basic principle described with reference to FIG. 1 are possible.

What is claimed is:

1. A synchronous motor which comprises: first and second coaxial spaced stator sections, each stator section including at least one annular coil, each stator section being annular and including a plurality of teeth arranged in two circular systems on the inner surface of said stator, the number of teeth in all stator systems being equal and the spacing between adjacent teeth in all stator systems being uniform, said annular coils being each surrounded by a soft ferromagnetic material, said ferromagnetic material and said annular coils constituting a magnetic circuit, said motor further including a rotor having a geometric axis and first, second, third, and fourth circular axially spaced systems of teeth which each comprise a plurality of teeth which are uniformly spaced about the circumference of said rotor, the number of teeth in each of said systems being equal to the number of teeth in every other rotor system and also equal to the number of teeth in each system of teeth in said stator, said systems in said rotor being disposed respectively in first, second, third, and fourth planes which are each disposed in substantially normal relationship to said geometric axis of said rotor, each plane in which one of said systems of said rotor is disposed also having one of said systems of said stator disposed therein, each of said systems of said rotor co-operating with one of said systems of said stator, said two systems of teeth in each of said stator sections being shifted angularly by substantially half of a tooth pitch relative to each other and said two stator sections being shifted angularly with respect to each other by substantially a quarter of a tooth pitch, said motor including a single permanent magnet which is disposed axially intermediate said stator sections and which magnetizes two systems of stator teeth which are in the same section and which are also in said first and second planes with substantially identical polarity distributions and two systems of teeth in the same section which are also in said third and fourth planes with substantially identical polarity distributions which are opposite to the polarity distributions of the systems in said first and second planes, said soft ferromagnetic material and said two systems of teeth in each stator section comprising part of a magnetic circuit which surrounds said annular coil of said stator sections, the axial distance between the teeth of said systems in one of said stator sections being at least a few times greater than the spacing between each system of stator teeth and the system of rotor teeth associated therewith, said stator sections being divided into an even number of pie shaped segments along axial surfaces, the stator teeth for each stator section being shifted by half a tooth pitch relative to the rotor teeth in circumferentially successive segments and said single permanent magnet magnetizing both systems of each circumferentially successive pie shaped segment with opposite polarities.

2. A synchronous motor which comprises: first and second coaxial spaced stator sections, each stator section including at least one annular coil, each stator section being annular and including a plurality of teeth arranged in two circular systems on the inner surface of said stator, the number of teeth in all stator systems being equal and the spacing between adjacent teeth in all stator systems being uniform, said annular coils being each surrounded by a soft ferromagnetic material, said ferromagnetic material and said annular coils constituting a magnetic circuit, said motor further including a rotor having a geometric axis and first, second, third, and fourth circular axially spaced systems of teeth which each comprise a plurality of teeth which are uniformly spaced about the circumference of said rotor, the number of teeth in each of said systems being equal to the number of teeth in every other rotor system and also equal to the number of teeth in each system of teeth in said stator, said systems in said rotor being disposed respectively in first, second, third, and fourth planes which are disposed in substantially normal relationship to said geometric axis of said rotor, each plane in which one of said systems of said rotor is disposed also having one of said systems of said stator disposed therein, each of said systems of said rotor co-operating with one of said systems of said stator, said two systems of teeth in each of said stator sections being shifted angularly by substantially half of a tooth pitch relative to each other and said two stator sections being shifted angularly with respect to each other by substantially a quarter of a tooth pitch, said motor including a single permanent magnet which is disposed axially intermediate said stator sections and which magnetizes two systems of stator teeth which are in the same section and which are also in said first and second planes with substantially identical polarity distributions and two systems of teeth in the same section which are also in said third and fourth planes with substantially identical polarity distributions which are opposite to the polarity distributions of the systems in said first and second planes, said soft ferromagnetic material and said two systems of teeth in each stator section comprising part of a magnetic circuit which surrounds said annular coil of said stator sections, the axial distance between the teeth of said systems in one of said stator sections being at least a few times greater than the spacing between each system of stator teeth and the system of rotor teeth associated therewith, said motor further comprises at least one compensation coil magnetically in parallel with said permanent magnet.

3. A synchronous motor as claimed in claim 2, wherein said permanent magnet is an axially magnetized ring which is coaxially disposed between said two stator sections, and wherein said compensation coil is annular and is disposed between said two stator sections in coaxial relationship with said permanent-magnetic ring.

4. A synchronous motor which comprises: first and second coaxial spaced stator sections, each stator section including at least one annular coil, each stator section being annular and including a plurality of teeth arranged in two circular systems on the inner surface of said stator, the number of teeth in all stator systems being equal and the spacing between adjacent teeth in all stator systems being uniform, said annular coils being each surrounded by a soft ferromagnetic material, said ferromagnetic material and said annular coils constituting a magnetic circuit, said motor further including a rotor having a geometric axis and first, second, third, and fourth circular axially spaced systems of teeth which each comprise a plurality of teeth which are uniformly spaced about the circumference of said rotor, the number of teeth in each of said systems being equal to the number of teeth in every other rotor system and also equal to the number of teeth in each system of teeth in said stator, said systems in said rotor being disposed respectively in first, second, third, and fourth planes which are each disposed in substantially normal relationship to said geometric axis of said rotor, each plane in which one of said systems of said rotor is disposed also having one of said systems of said stator disposed therein, each of said systems of said rotor co-operating with one of said systems of said stator, said two systems of teeth in each of said stator sections being shifted angularly by substantially half of a tooth pitch relative to each other and said two stator sections being shifted angularly with respect to each other by substantially a quarter of a tooth pitch, said motor including a single permanent magnet which is disposed axially intermediate said stator sections and which magnetizes two systems of stator teeth which are in the same section and which are also in said first and second planes with substantially identical polarity distributions and two systems of teeth in the same section which are also in said third and fourth planes with substantially identical polarity distributions which are opposite to the polarity distributions of the systems in said first and second planes, said soft ferromagnetic material and said two systems of teeth in each stator section comprising part of a magnetic circuit which surrounds said annular coil of said stator sections, the axial distance between the teeth of said systems in one of said stator sections being at least a few times greater than the spacing between each system of stator teeth and the system of rotor teeth associated therewith, wherein each of said magnetic circuits which surround the annular coils consist of integrally manufactured laminations which are disposed in substantially axial planes.

5. A synchronous motor as claimed in claim 4 wherein said annular coils are surrounded by a coil former provided with positioning means for locating said laminations.

6. A synchronous motor as claimed in claim 5 wherein said laminations are U-shaped and have limbs extending in the air gap between the stator and rotor for the formation of the systems of stator teeth and said positioning means being such that the end of the one limb of each U-shaped lamination inside the air gap is shifted by half a tooth pitch relative to the end of the other limb.

7. A synchronous motor as claimed in claim 6 wherein said permanent magnet is an axially magnetized permanent-magnetic ring, and wherein said laminations at the side which faces the permanent magnetic ring are provided with a folded portion, which is disposed in a plane which is substantially perpendicular to the axis of said motor, for receiving the flux of said permanent magnet.

8. A synchronous motor which comprises: first and second coaxial spaced stator sections, each stator section including at least one annular coil, each stator section being annular and including a plurality of teeth arranged in two circular systems on the inner surface of said stator, the number of teeth in all stator systems being equal and the spacing between adjacent teeth in all stator systems being uniform, said annular coils being each surrounded by a soft ferromagnetic material, said ferromagnetic material and said annular coils constituting a magnetic circuit, said motor further including a rotor having a geometric axis and first, second, third, and fourth circular axially spaced systems of teeth which each comprise a plurality of teeth which are uniformly spaced about the circumference of said rotor, the number of teeth in each of said systems being equal to the number of teeth in every other rotor system and also equal to the number of teeth in each system of teeth in said stator, said systems in said rotor being disposed respectively in first, second, third, and fourth planes which are disposed in substantially normal relationship to said geometric axis of said rotor, each plane in which one of said systems of said rotor is disposed also having one of said systems of said stator disposed therein, each of said systems of said rotor co-operating with one of said systems of said stator, said two systems of teeth in each of said stator sections being shifted angularly by substantially half of a tooth pitch relative to each other and said two stator sections being shifted angularly with respect to each other by substantially a quarter of a tooth pitch, said motor including a single permanent magnet which is disposed axially intermediate said stator sections and which magnetizes two systems of stator teeth which are in the same section and which are also in said first and second planes with substantially identical polarity distributions and two systems of teeth in the same section which are also in said third and fourth planes with substantially identical polarity distributions which are opposite to the polarity distributions of the systems in said first and second planes, said soft ferromagnetic material and said two systems of teeth in each stator section comprising part of a magnetic circuit which surrounds said annular coil of said stator sections, the axial distance between the teeth of said systems in one of said stator sections being at least a few times greater than the spacing between each system of stator teeth and the system of rotor teeth associated therewith, said permanent magnet being an axially magnetized permanent-magnetic ring, each of said magnetic circuits surrounding the annular coils of each stator sections each consisting of two parallel annular plates which are disposed in planes substantially perpendicular to the axis of the rotor, at the inner circumference of which said systems of teeth are formed and whose outer circumference adjoins the inner surface of a cylindrical ring belonging to said stator section, between which plates and the cylindrical ring the annular coil is included, both cylindrical rings extending as far as the permanent-magnetic ring and being provided with means for receiving the flux of the permanent-magnetic ring, so that between the two annular plates which face the permanent-magnetic ring and the permanent magnetic ring spaces are obtained with a magnetic resistance which is comparatively high relative to the magnetic resistance between the permanent-magnetic ring and the cylindrical ring.

9. A synchronous motor as claimed in claim 8 wherein said motor comprises at least one compensation coil coaxially disposed with respect to said motor axis in at least one of said spaces.

10. A synchronous motor which comprises: first and second coaxial axially spaced stator sections, each stator section including at least one annular coil, each stator section being annular and including a plurality of teeth arranged in two circular systems on the inner surface of said stator, the number of teeth in all stator systems being equal and the spacing between adjacent teeth in all stator systems being uniform, said annular coils being each surrounded by a soft ferromagnetic material, said ferromagnetic material and said annular coils constituting a magnetic circuit, said motor further including a rotor having a geometric axis and four circular axially spaced systems of teeth which each comprise a plurality of teeth which are uniformly spaced about the circumference of said rotor, the number of teeth in each of said systems being equal to the number of teeth in every other rotor system and also equal to the number of teeth in each system of teeth in said stator, each of said systems in said rotor extending through a single plane which is disposed in substantially normal relationship to said geometric axis of said rotor, each plane which extends through one of said systems of said rotor also extending through one of said systems of said stator, each of said systems of said rotor co-operating with one of said systems of said stator, said two systems of teeth in each of said stator sections being shifted angularly by substantially half a tooth pitch relative to each other and said two stator sections being shifted angularly with respect to each other by substantially a quarter of a tooth pitch relative to each other, said stator including a single permanent magnet which is disposed axially intermediate said stator sections and which magnetizes both systems of stator teeth in said first stator section with a first polarity and both systems of teeth of said second stator section with a second polarity, said soft ferromagnetic material and said two systems of teeth in each stator section comprising part of a magnetic circuit which surrounds said annular coil of said stator section, the axial distance between the teeth of said systems in one of said stator sections being at least a few times greater than the spacing between each system of stator teeth and the system of rotor teeth associated therewith.

* * * * *